Patented Oct. 27, 1925.

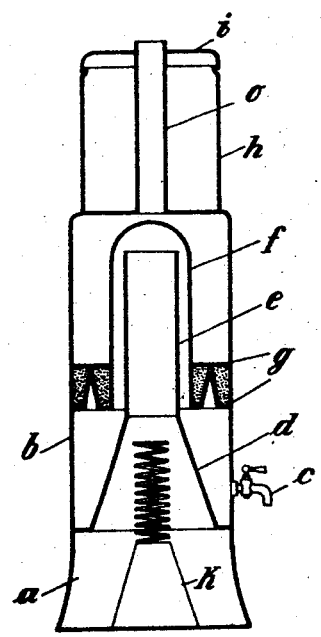

1,558,896

UNITED STATES PATENT OFFICE.

LEOPOLD KIRSCHMANN, OF BERLIN-HALENSEE, GERMANY.

EXTRACTING OR COFFEE MACHINE.

Application filed December 20, 1923. Serial No. 681,778.

*To all whom it may concern:*

Be it known that I, LEOPOLD KIRSCHMANN, a citizen of the German Republic, residing at Berlin-Halensee, Germany, have invented certain new and useful Improvements in Extracting or Coffee Machines, of which the following is a specification.

This invention relates to an extracting- or coffee-machine in which the material, from which the extract has to be prepared, is submitted to the alternating action of steam, hot air and jets of cold water. Owing to the construction of the machine the materials, from which the extract is made, are held separate from the extract so that the two cannot come in contact.

By the action of hot air, and steam and finely sprayed water on the material enclosed between the sieves the material is thoroughly extracted without any chemical decomposition of the chemicals which are bound in the material.

When the machine is to be heated by electricity heating spirals are used which are freely exposed to the air, so that the heating is effected by free radiation in opposition to other electrically heated apparatus in which the heating spirals are embedded in asbestos or mica in or under the bottom plate. The coffee machine according to the invention is so constructed that no soldering is necessary. The several elements of which the machine is composed are pressed or drawn.

The invention will be best understood from a consideration of the following detailed description taken in connection with the accompanying drawings forming a part of this specification, with the understanding that while on the drawings several embodiments of the invention are disclosed, the invention is not confined to any strict conformity with the showing of the drawings, but may be embodied in any manner which does not make a material departure from its salient features of the invention.

In the drawing:—

The figure shows in sectional elevation an extracting machine heated electrically.

Referring to the drawing a cylindrical hollow body $b$ is mounted on the hollow support $a$ and at its lower end a tap cock $c$. The bottom plate of the cylindrical body $b$ has a central aperture. On the bottom plate of the cylindrical body $b$ around the central aperture an upwardly directed truncated cone $d$ is mounted which carries a hollow cylinder $e$. A hood $f$ which covers the cylinder $e$ is fixed in the cylindrical body $b$ by means of a double wire gauze $g$.

Small perforated tubes between the double wire gauze $g$ are designed to favour the circulation of the air. Between the double wire gauze the material is enclosed which is to be extracted.

On the perforated top plate of the cylindrical body $b$ a water reservoir $h$ is mounted. A tube $o$ mounted at the centre of the top plate of the cylindrical body $b$ traverses the water reservoir and serves as chimney for the heating gases. The upper open end of tube $o$ projects through the lid $i$ of the water reservoir. The water from reservoir $h$ drops through the holes in the top plate of the cylindrical body $b$ upon the double wire gauze $g$ to filter through the material to be extracted.

In the hollow base $a$ the heating device is arranged which consists for instance of an electric heater $k$ the heating spirals of which project into the conical support $d$ and are freely exposed to the air and adapted to be switched in or out of circuit in any convenient manner. The heated air rises through the open cylinder $e$ under the hood $f$ and descends in the space between the outer surface of the hollow cylinder $e$ and the inner surface of hood $f$ into the space below the double wire gauze $g$, to flow upward through the double wire gauze in traversing the material to be extracted, whereupon the hot air comes in contact with the water dropping through the top plate of the cylindrical casing $a$. The hot air escapes finally through the tube $o$.

I claim:—

An extracting- or coffee machine comprising in combination a hollow base, an outer cylindrical body on said base closed at both ends and having a central opening in the bottom plate, a source of heat in said hollow base projecting into the lower end of said cylindrical body, an upwardly projecting truncated cone on the bottom plate of said cylindrical body, a hollow cylinder open at both ends mounted on said truncated cone, a hood over the upper end of said cylinder, a double wire gauze fixed on the outer surface of said hood and on the inner surface of said cylindrical body and designed to receive the material to be extracted, a water reservoir on the perforated top plate of the cylindrical body, a tube serving as chimney for the heating gases extending from the top plate of the cylindrical body traversing said water reservoir and projecting through the lid of the same, and a tap cock at the lower end of said cylindrical body.

In testimony whereof I affix my signature.

LEOPOLD KIRSCHMANN.